United States Patent [19]

Schartz

[11] Patent Number: 4,558,890
[45] Date of Patent: Dec. 17, 1985

[54] MULTI-PORT HYDRAULIC SWIVEL

[75] Inventor: Charles O. Schartz, Larned, Kans.

[73] Assignee: Pickle Creek Mfg., Inc., Larned, Kans.

[21] Appl. No.: 501,553

[22] Filed: Jun. 10, 1983

Related U.S. Application Data

[63] Continuation-in-part of Ser. No. 470,299, Feb. 28, 1983, abandoned.

[51] Int. Cl.[4] ............................................. F16C 39/04
[52] U.S. Cl. ........................................ 285/13; 285/94; 285/136; 285/DIG. 18
[58] Field of Search ................... 285/136, DIG. 18, 13, 285/94; 239/710

[56] References Cited

U.S. PATENT DOCUMENTS

| | | | |
|---|---|---|---|
| 1,497,652 | 6/1924 | Browne | 285/13 |
| 2,210,088 | 8/1940 | Longfield | 285/13 |
| 2,343,491 | 3/1944 | Bard et al. | 285/136 |
| 2,536,565 | 11/1951 | Ostergren | 285/13 X |
| 2,768,843 | 10/1956 | Zeilman | 285/136 X |
| 3,477,746 | 11/1969 | Watson | 285/119 |
| 3,698,433 | 10/1972 | Dobler | 137/615 |
| 3,776,270 | 12/1973 | Wanger | 137/580 |
| 4,101,148 | 7/1978 | Lee | 285/13 |
| 4,142,084 | 2/1979 | Torrani | 285/13 X |
| 4,186,763 | 2/1980 | Ferguson | 137/344 |
| 4,405,162 | 9/1983 | Williams | 285/136 X |

Primary Examiner—Thomas F. Callaghan
Attorney, Agent, or Firm—E. Robert Newman

[57] ABSTRACT

A multi-port hydraulic swivel joint (10) in which a high pressure flow channel (34) is located adjacent an enclosed end (15a) of the swivel joint, the pressure in the return line is maintained at a low level to provide low pressure fluid which is transmitted through a flow channel (37) adjacent to an open end of the swivel joint, and the return flow channel (36) is located between the other two. A passageway (43) communicates fluid which has seeped to a cavity between the high pressure flow channel and the enclosed end to the return flow channel (36), a raceway (44) with steel balls (46) resist forces tending to separate the stator (30) and rotor (40) of the swivel joint, and a lip seal (49) with grease packing seals the low pressure flow channel (37) from the open end (15) of the swivel joint. In another mode an extension (39e) of L-shaped passageway (39b), through which return flow channel (36) delivers fluid received from the motor to reservoir, communicates between the cavity adjacent the enclosed end and return flow channel (36).

10 Claims, 5 Drawing Figures

MULTI-PORT HYDRAULIC SWIVEL

This application is a continuation-in-part of application Ser. No. 470,299, filed Feb. 28, 1983 and now abandoned.

TECHNICAL FIELD

The present invention relates generally to center pivot irrigation systems having hydraulic fluid actuated drives, and more particularly to those supplying such fluid to such drives, as well as to other amenities such as valves operating intermittent end gun sprinklers, from a stationary pump mounted at or near the center point of the irrigation system.

BACKGROUND ART

A center pivot irrigation system employing an end gun sprinkler must typically deliver oil to drive hydrostatic motors under pressures in the 1,500 P.S.I. to 2,000 P.S.I. range. In addition to the high pressure hose a return hose must carry oil back to a reservoir, usually located at the pump. Before the oil enters the reservoir, it passes through a restrictor valve which maintains 65 P.S.I. in the return line. This relatively low pressure is used to pressurize an end gun control circuit.

A typical end gun control circuit consists of a small low pressure line running from the reservoir the length of the system to a diaphragm valve which is utilized to turn the end gun sprinkler on and off. This diaphragm valve is controlled in a programmed manner by a conventional three-way control valve which is actuated by cams and located at the pivot point. When the control valve is open the circuit is open directly back to the reservoir. When the valve is actuated, the low pressure is applied to the diaphragm valve. Accordingly, the end gun sprinkler may be shut off as the system passes by roads or other areas where water is not desired. Generally, the low pressure is applied to the end gun sprinkler only about 20% of the time.

Because the pump, reservoir, restricter valve and end gun control valve are stationary and located at the pivot point, three hoses, a very high pressure line, a return line at low pressure and a low pressure line follow the sprinklers as they rotate about the pivot point. These lines will continually be wrapped around the pivot point as the system rotates unless other provisions are made.

A common solution is to provide flexible hoses of sufficient length to permit several revolutions before the system must be stopped and the hoses disconnected. Then the hoses are typically rewrapped around the pivot point in a direction opposite to that which the system will travel and then reconnected. If the operator forgets to rewrap the hoses or the hoses catch on an obstruction during operation, they may be pulled apart and, as a consequence, the hydraulic oil is lost and the hydraulic pump may suffer severe damage.

Another solution which has been attempted is to use hydraulic swivel joints. Hydraulic swivel joints, which form circular flow channels between a stationary element and a rotating element, are well known. Originally such joints were designed to define a high pressure constant flow port and a low pressure port; however, additional ports have been subsequently added. Such multi-port swivel joints were originally designed for use in high speed applications and where frequent observation and maintenance is practical.

Such swivel joints generally employ neoprene O-rings, or the like, which function satisfactorily in applications where moderate to high speeds are encountered, and the speed of the rotating member helps maintain seal contact. However, center pivot irrigation systems may revolve no more than one time in each 20 to 120 hours. Under these conditions, neoprene O-rings and their derivatives have a high tendency to stick to one or both members of the swivel. When this sticking occurs, the O-rings tear, bunch or wad. Also, if such O-ring seals are initially defective, or are damaged even slightly during installation or assembly, a leak is guaranteed. Any flaw, regardless of how derived, will almost instantly become an unmanageable leak under pressures of the magnitude encountered in a center pivot irrigation system. This problem is magnified by the pulsations from variable displacement pumps which are widely used in center pivot irrigation systems.

Heretofore, in a typical three port hydraulic swivel joint, the highest pressure is distributed from the center port in order that those ports which are under less pressure will be adjacent to the exterior. By use of this configuration, the seals which separate the interior of the swivel joint from the environment would ordinarily have a better chance of keeping the oil within the joint and contamination outside of it. However, there is a major disadvantage of this configuration when used in a center pivot irrigation system. If the seal which separates the center high pressure port and the end gun sprinkler port should leak, high pressure oil will enter the end gun port. If the end gun circuit is open there is no problem since this oil will return to reservoir. However, if the end gun circuit is closed, the high pressure oil will enter the 65 P.S.I. end gun circuit and either rupture the small end gun line or possibly ruin the diaphragm valve.

DISCLOSURE OF THE INVENTION

An object of the present invention is the provision of an improved hydraulic swivel joint.

Another object is to provide a hydraulic swivel joint which separates the flow channel for high pressure oil from the flow channel leading to a low pressure line and an easily damaged valve.

A further object of the invention is the provision of a hydraulic swivel joint in which the elements are better sealed from the interior of the joint.

Still another object is to provide a hydraulic swivel joint in which the flow channel carrying the highest pressure to which oil is subjected may be adjacent to the exterior of the joint and yet substantially sealed therefrom.

A still further object is the provision of a hydraulic swivel joint having means for maintaining alignment of the flow channel parts while allowing minimal frictional contact by those elements separating the flow channels from each other and the environment.

Yet another object of the invention is to provide a hydraulic swivel joint which will operate efficiently at the very slow speeds and great hydraulic pressure differentials confronted in center pivot irrigation systems.

In a more general sense, it is an object of this invention to provide a multi-port swivel joint in which a high pressure flow channel is located adjacent to an enclosed end of the swivel joint away from the end of the joint receiving connections to the pump and reservoir, in which a low pressure fluid line is located adjacent to the end of the joint receiving connections to the pump and reservoir, and in which a return line under low pressure is located between the former two lines. This organization of the flow channels within the swivel joint is primarily made possible by the inclusion of a passageway which communicates from the cavity between the high pressure flow channel and the enclosed end of the joint to the return line flow channel.

To counteract the pressure applied to the enclosed end of the valve through the passageway and to maintain alignment of the stator and rotor elements of the joint, a raceway containing ball bearings is located between the enclosed end of the valve and the point at which the passageway communicates above the high pressure flow channel.

The three flow channels are substantially formed by two O-ring seals affixed to the stator element between adjacent channels and a single O-ring seal affixed to the stator element at either extremity of the three flow channels. Additionally, a lip seal is affixed to the interior of the rotor element at a location which is spaced away from the low pressure flow channel, thereby providing a cavity for packing with grease and further sealing the interior of the swivel joint from the environment.

In one mode, the passageway is in the shape of an elongated "C", is located within the wall of the rotor element, and extends from a point above the high pressure flow channel and below the ball bearing rollway, to a point adjacent the return line flow channel. In another mode, the passageway is an extension of a vertical return connection which is formed by drilling a vertical passageway within the stator element which intersects with a horizontal passageway to the return line flow channel. The extension, running to the top of the stator element, will provide communication between the enclosed end of the joint and the return line flow channel.

These and other objects, advantages and novel features of the present invention will become apparent from the following detailed description of the invention when considered in conjunction with the accompanying drawings.

BEST MODES FOR CARRYING OUT THE INVENTION

Figure 1:
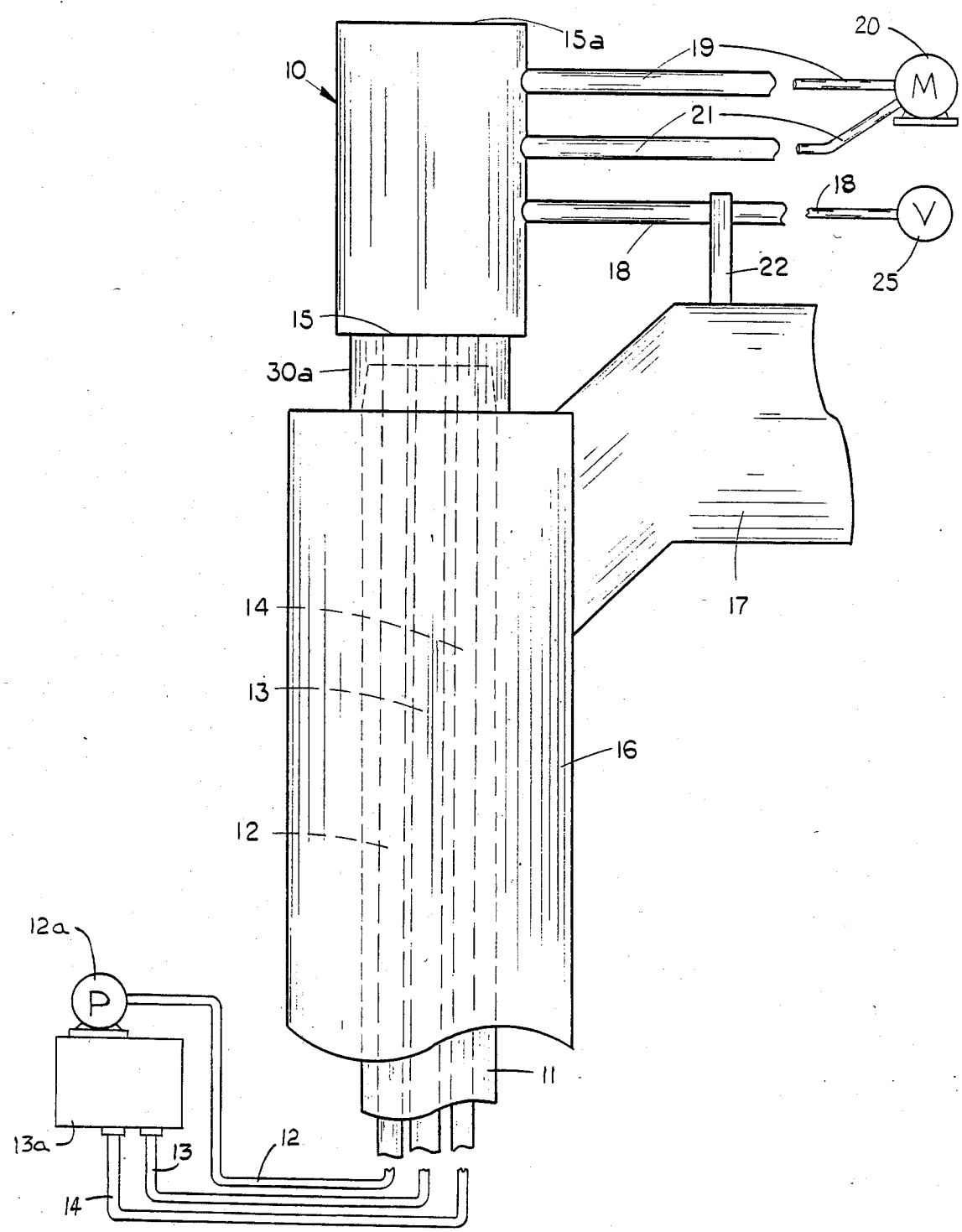
FIG. 1 is an elevational view of the swivel joint of the present invention shown installed on a center-pivot irrigation system, which is partially depicted.

Referring now to the drawings, wherein like reference numerals designate identical or corresponding parts throughout the several views, and more particularly to FIG. 1, whereon the swivel joint is designated generally at (10), swivel joint (10) is supported by being fixedly attached as set forth hereinafter to tubular structure (11). High pressure fluid line (12), return line (13), and low pressure fluid line (14) are contained within tubular structure (11). High pressure line (12) runs from stationary pump 12a to open end (15) of swivel joint (10). Return line (13) runs from end (15) to stationary reservoir 13a which is located adjacent to the pump. Low pressure line (14) runs from the reservoir to end (15) of swivel joint (10). The desired low pressure in line (14) is achieved by passing the return line oil through a restrictor valve (not shown) before it enters the reservoir. In center pivot irrigation systems the pressure required to operate end gun sprinkler valves (generally of the diaphragm type) is so low in relation to the pressure required to operate the hydrostatic motors which propel the water distribution pipe and support towers about the pivot point that the maintenance of this pressure in the return line does not effect the functioning of the hydrostatic drive motors.

Riser tube (16) and elbow joint (17) distribute water circularly about tubular structure (11) by being propelled by hydrostatic motors 20 which activate the drive units which carry the support towers of the systems (not shown). After leaving low pressure line (14) the fluid therein is delivered from swivel joint (10) via low pressure line (18) to the valve 25 which operates the end gun sprinkler. High pressure line (19) is connected to swivel joint (10) at a point near closed end (15a) of swivel joint (10) and return line (21) enters swivel joint (10) between low pressure line (18) and high pressure line (19). Low pressure line (18), high pressure line (19), return line (21), and rotor element (40) (see FIG. 2) of swivel joint (10) revolve about tubular structure (11) (along with riser tube (16)) by being linked thereto through support link (22). Support link (22) is affixed between elbow (17) and low pressure line (18).

Figure 2:
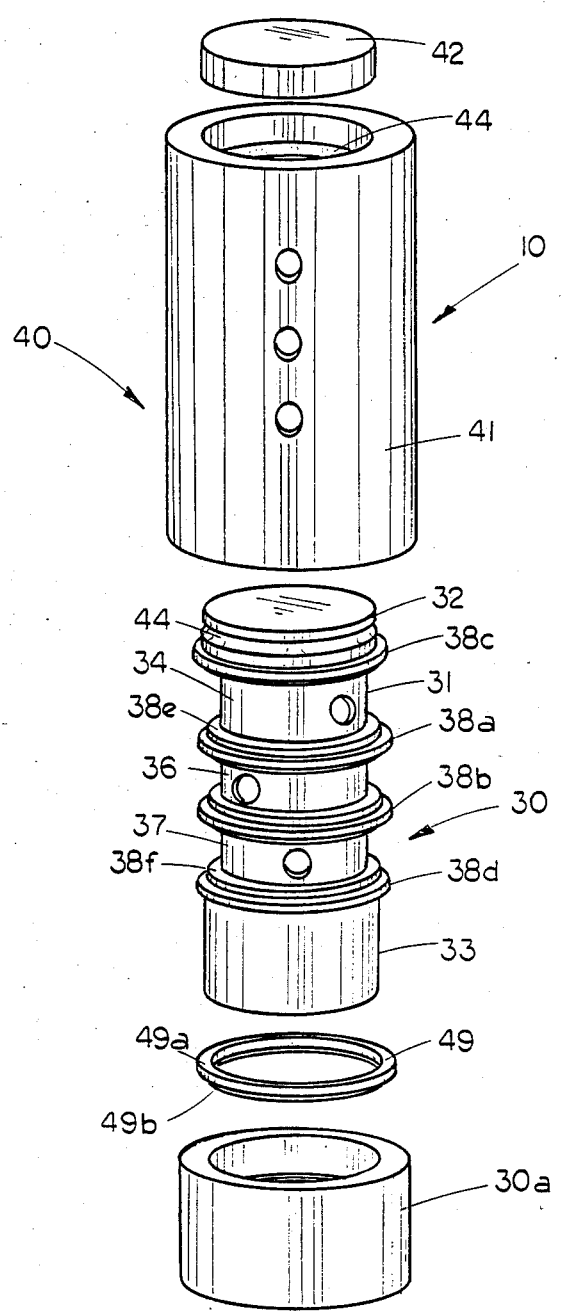
FIG. 2 is an exploded perspective view of the swivel joint of the present invention.

Referring now to FIG. 2, swivel joint (10) is seen as comprised of stator element (30) and rotor element (40). Stator (30) (see also FIG. 3) is of circular cross-section and is substantially comprised of a smaller diameter center section (31) sandwiched between a larger diameter portion (32) and a larger diameter portion (33), both portions (32) and (33) having the same diameter. Portion (32) is adjacent closed end (15a) of joint (10) and portion (33) is adjacent open end (15) of joint (10). Center section (31) is divided into three sections which become, beginning with that section adjacent to portion (32) and moving towards portion (33), high pressure flow channel (34), return flow channel (36), and low pressure flow channel (37). These three flow channels are formed by locating two spaced apart O-ring seals (38a and 38b) intermediate portions (32) and (33), one O-ring seal (38c) adjacent portion (32) and one O-ring seal (38d) adjacent portion (33). O-ring seals (38a) and (38b) are supported by annular extensions (38e) located above and below each seal and O-ring seals (38c) and (38d) are supported against portions (32) and (33), respectively, by annular extensions (38f).

Figure 3:
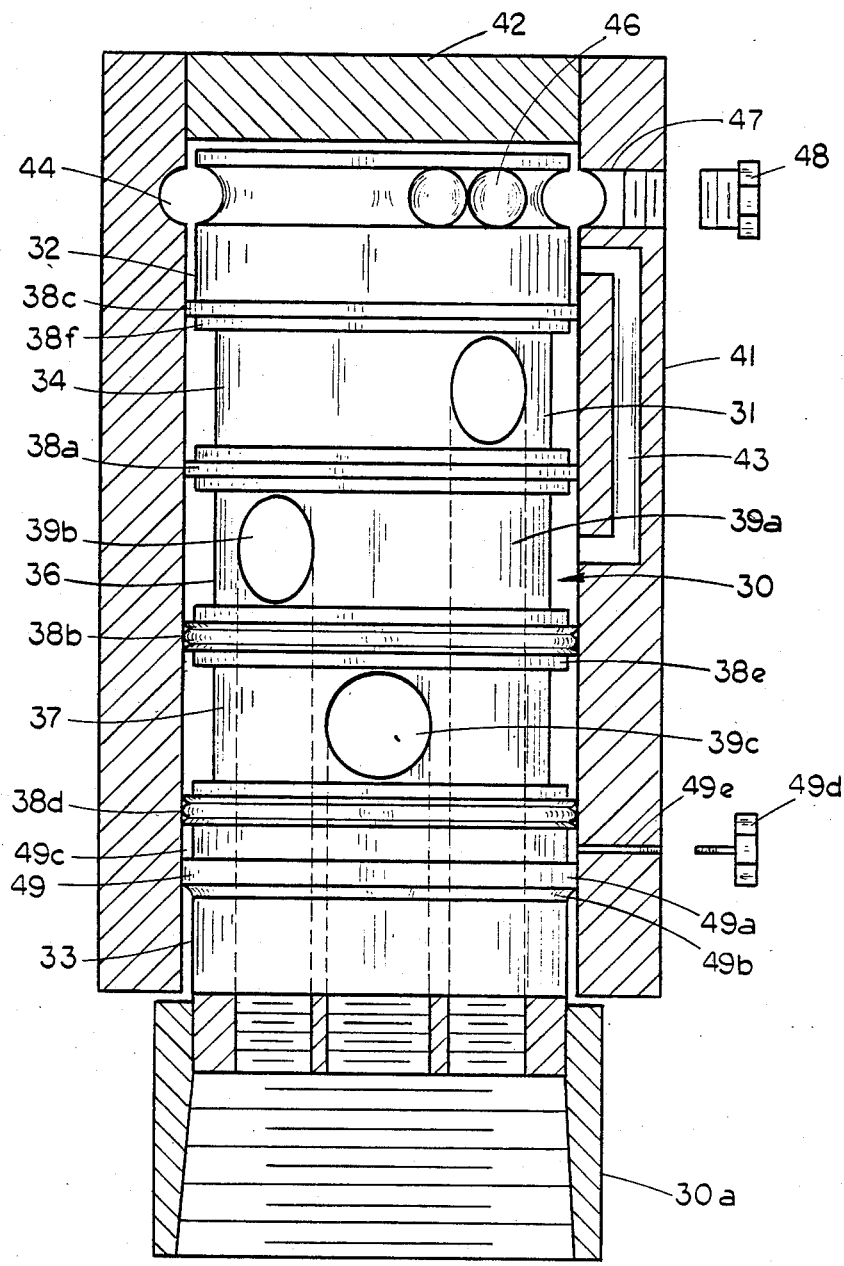
FIG. 3 is an enlarged partial section of the swivel joint of the present invention.

Referring now to FIG. 3, each of the flow channels (34), (36), and (37) are connected by an L-shaped passageway (39a), (39b), and (39c), respectively, to the end of stator (30) which is adjacent to portion (33) thereof and open end (15) of joint (10). Passageways (39a), (39b), and (39c) are formed by end-boring stator (30) to the level of each respective flow channel and then drilling holes through the sidewalls of each respective flow channel to intersect therewith. Each passageway (39a), (39b), and (39c) is then threaded at its opening in portion (33) of stator (30) for a short distance to receive its respective hydraulic line from the pump and reservoir. A pipe coupling (30a) is then press-fitted to the bottom of stator (30) for threaded connection to tubular support (11) (see also FIG. 1).

Referring again to FIGS. 2 and 3, rotor element (40) primarily comprises hollow cylinder (41) which has an approximate interior diameter slightly larger than the diameter of O-ring seals (38a), (38b), (38c), and (38d). Cap (42) encloses one end of rotor (40) to completely seal from the exterior the portion (32) of stator (30) and thereby form closed end (15a) of swivel joint (10). Any fluid tending to leak from high pressure flow channel (34) will ultimately be stopped by cap (42). Fluid leaking through O-ring (38a) will enter return flow channel (36) with no deleterious effect. To further insure the containment of the high pressure fluid, passageway (43) is machined into the wall of rotor cylinder (41). It provides an escape route to flow channel (36) for any high pressure fluid which might seep through O-ring seal (38c).

Pressure in return flow channel (36) acting through passageway (43), will push against the inner face of cap (42), thus tending to force stator (30) out of rotor (40). To combat this effect a doughnut shaped raceway (44) is machined from adjoining surfaces of stator (30) and rotor cylinder (41) just above the point from which passageway (43) exits above O-ring seal (38c). Raceway (44) is filled with a plurality of steel balls (46), which are inserted through port (47) in rotor cylinder (41). Port (47) is then closed with plug (48) to contain steel balls (46) and oil in the space between upper portion (32) of stator (30) and the adjacent interior of rotor (40).

Because channel (37) carries a relatively low pressure and also because it is pressurized only about 20% of the time, it is the ideal channel to locate adjacent to open end (15) of joint (10). As noted above, both low pressure channel (37) and return channel (36) carry the same pressure. Thus return channel (36) is positioned to serve as an additional buffer between high pressure channel (34) and low pressure channel (37). Outside contamination which might enter through open end (15) of hydraulic swivel (10) is sealed therefrom by resilient lip seal (49). Lip seal (49) is comprised of a support ring (49a) and resilient portion (49b) of triangular cross section. Support (49a) is affixed to the interior of rotor cylinder (41) and resilient member (49b) is sized so as to press against the outer diameter of portion (33) of stator (30). Lip seal (49) is spaced away from O-ring seal (38d) a short distance so as to create grease cavity (49c). Grease fitting (49d) and port (49e) provide access to grease cavity (49c).

Since high pressure flow channel (34) is so effectively sealed from the exterior by cap (42) and passageway (43) and from low pressure flow channel (37) by return flow channel (36), it is practicable to use cast iron piston ring-type seals instead of seals made of neoprene for O-rings (38a) and (38c). The small leakage encountered with piston ring-type seals is minimal and will not harm joint (10) as explained hereinabove. A further advantage of the cast iron seals is that pulsations in the hydraulic oil pressure will not erode them and thereby cause an increase in leakage throughout the life of the swivel joint. For O-ring seals (38b) and (38d), molythane or a similar material is preferred over neoprene, due to its relative rigidity.

Figure 4:
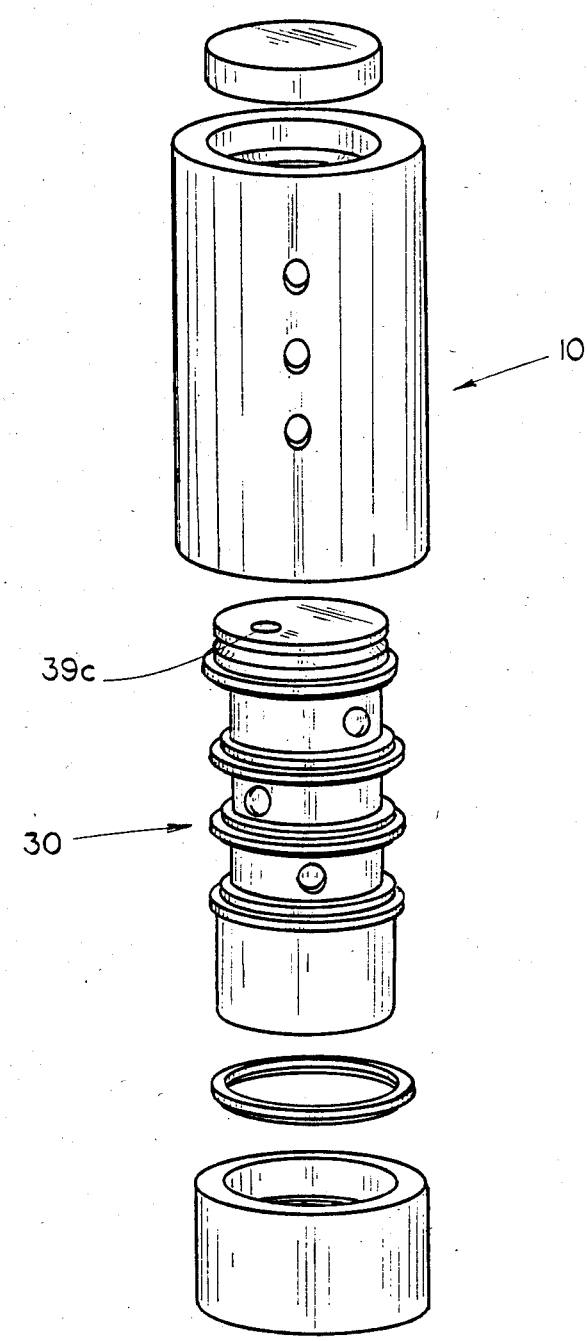
FIG. 4 is an exploded perspective view of an alternate mode of the swivel joint of the present invention.
Figure 5:
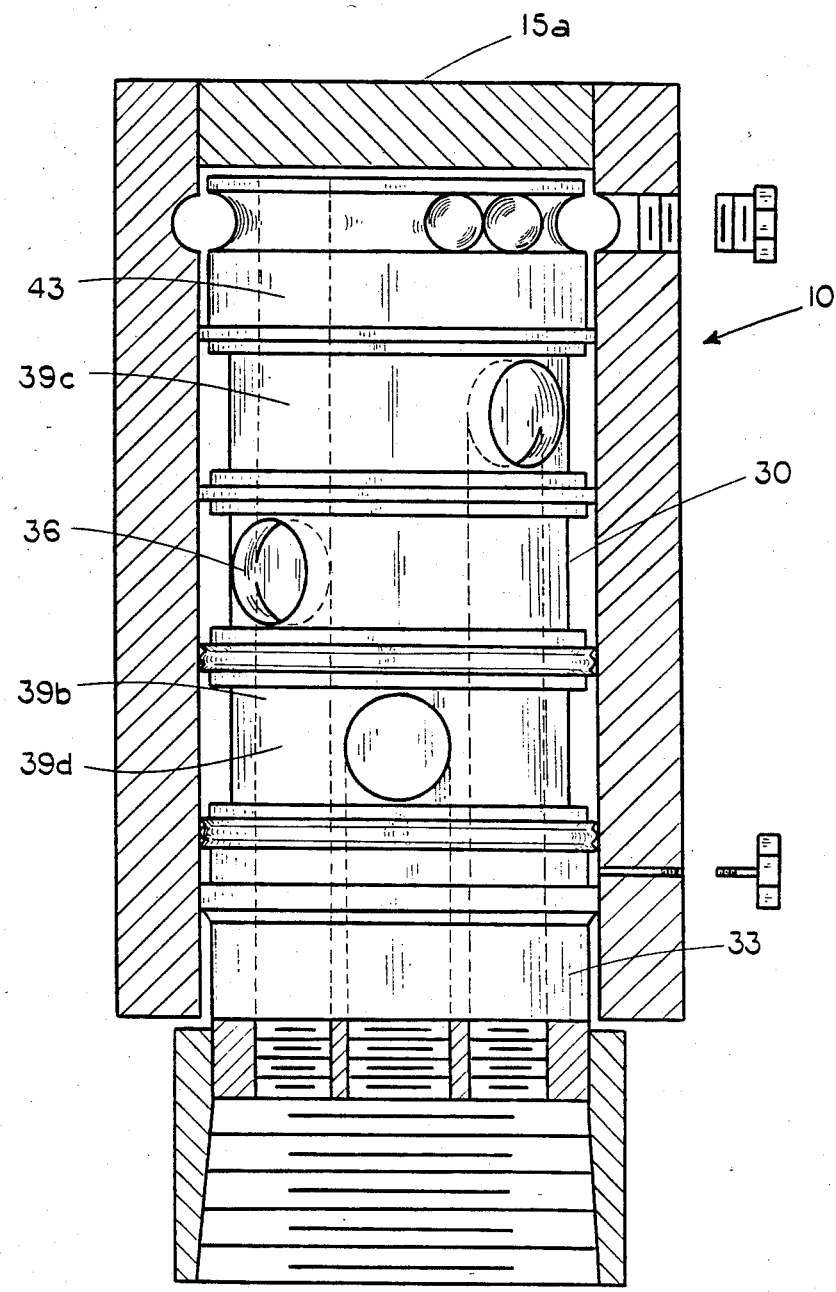
FIG. 5 is an enlarged partial section of the mode of FIG. 4.

In another mode, passageway (43) in the wall of rotor (41) (See FIG. 3 of the first mode.) is dispensed with. In lieu thereof and as depicted on FIGS. 4 and 5, the vertical portion (39d) of L-shaped passageway (39b) is extended all the way through stator (30) to its end adjacent closed end (15a) of swivel joint (10). Thus, in this mode of swivel joint (10) the passageway which connects return line flow channel (36) to the end of stator (30) adjacent to portion (33) thereof is T-shaped and also serves as a substitute for passageway (43) of the mode described hereinabove, its extension of L-shaped passageway (39b) being designated on FIGS. 4 and 5 as (39c). The benefits provided by passageway (43) set forth hereinabove are substantially achieved by extension (39c) in this mode.

It is believed that all of the objects mentioned above are accomplished by use of the mode for carrying out the invention disclosed herein. Obviously many modifications and variations of the present invention are possible in light of the above teachings. It is therefore to be understood that, within the scope of the appended claims, the invention may be practiced otherwise than as specifically described.

I claim:

1. A multi-port hydraulic swivel joint of the type having coaxial stator and rotor elements forming a unit having an axially spaced flow channel for each port for receiving high pressure fluid from a stationary pump into a first end of the stator element and delivering it to a hydrostatic motor which revolves about the swivel joint, for receiving return fluid under low pressure from the motor and delivering it from the stator first end to a stationary reservoir located adjacent to the pump, and for receiving low pressure fluid from the reservoir into the stator first end and delivering it to a valve means which also revolves about the swivel joint, the improvement comprising a rotor element which is characterized as being a hollow cylinder having a cap affixed to its end which is adjacent to the stator second end; the low pressure fluid flow channel being located nearest to the stator first end, the high pressure flow channel farthest from the stator first end and the return flow channel between the other two; and a stator which is characterized as being substantially of solid material and having L-shaped passageways therewithin for delivering high pressure and low pressure fluid and a T-shaped passageway therewithin wherein the stem of the T-shape is connected to the return flow channel, one arm of the T-shape communicates with the reservoir and the other arm of the T-shape communicates with the cavity formed by the cap and the stator second end, whereby any high pressure fluid escaping from the high pressure flow channel into said cavity or into said return flow channel can escape therefrom for delivery to the reservoir without entering the low pressure flow channel.

2. The multi-port hydraulic swivel joint of claim 1 wherein the flow channels are formed by O-ring seals affixed to the stator and located between each adjacent channel, between the stator first end and the low pressure flow channel and between the stator second end and the high pressure flow channel.

3. The multi-port hydraulic swivel joint of claim 2 further comprising a lip-seal affixed to the inside of the rotor element and located between said O-ring nearest the stator first end and the stator first end.

4. The multi-port hydraulic swivel joint of claim 3 further comprising a grease fitting located in the rotor wall for access to the cavity formed by said O-ring nearest the stator first end and said lip-seal and grease filling said cavity.

5. The multi-port hydraulic swivel joint of claim 2 wherein the O-ring seal between the high pressure and return flow channels and the O-ring seal between the stator second end and the high pressure channel are of the cast iron piston-type.

6. The multi-port hydraulic swivel joint of claim 3 wherein the O-ring seal between the return fluid flow channel and the low pressure flow channel and the O-ring seal between the low pressure flow channel and the lip seal are of molythane.

7. The multi-port hydraulic swivel joint of claim 2 further comprising a means for forming a raceway within the rotor and stator unit, a means for forming a closeable bearing port to said raceway forming means within the wall of the rotor element and a plurality of bearings located within said raceway forming means.

8. The multi-port hydraulic swivel joint of claim 1, wherein the arms of the T-shape are created by boring entirely through the stator element.

9. A multi-port hydraulic swivel joint of the type having coaxial stator and rotor elements forming a unit having an axially spaced flow channel for each port for receiving a pressurized fluid into a first end of the stator element and delivering it to a remote device which revolves about the swivel joint and a port for receiving return fluid from the device and delivering it from the stator first end to a stationary reservoir located adjacent thereto, the improvement comprising a rotor element which is characterized as being a hollow cylinder having a cap affixed to its end; the highest pressure flow channel being located adjacent to the stator second end and the return flow channel adjacent to it; and a stator which is characterized as being substantially of solid material and having an L-shaped passageways therewithin for each port receiving a pressurized fluid and a T-shaped passageway therewithin wherein the stem of the T-shape is connected to the return flow channel, one arm of the T-shape communicates with the reservoir and the other arm of the T-shape communicates with the cavity formed by the cap and the stator second end, whereby any of the highest pressure fluid escaping from the highest pressure flow channel into said cavity or into said return flow channel can escape therefrom for delivery to the reservoir without entering lower pressure flow channels.

10. The multi-port hydraulic swivel joint of claim 9, wherein the arms of the T-shape are created by boring entirely through the stator element.

* * * * *